(12) United States Patent
Perrone

(10) Patent No.: US 9,336,203 B2
(45) Date of Patent: May 10, 2016

(54) SEMANTICS-ORIENTED ANALYSIS OF LOG MESSAGE CONTENT

(71) Applicant: TIBCO Software Inc., Palo Alto, CA (US)

(72) Inventor: Michael Perrone, Los Altos, CA (US)

(73) Assignee: TIBCO Software Inc., Palo Alto, CA (US)

(*) Notice: Subject to any disclaimer, the term of this patent is extended or adjusted under 35 U.S.C. 154(b) by 103 days.

(21) Appl. No.: 13/946,592

(22) Filed: Jul. 19, 2013

(65) Prior Publication Data
US 2015/0025875 A1    Jan. 22, 2015

(51) Int. Cl.
*G06F 17/27* (2006.01)

(52) U.S. Cl.
CPC ................................ *G06F 17/2785* (2013.01)

(58) Field of Classification Search
None
See application file for complete search history.

(56) References Cited

U.S. PATENT DOCUMENTS

| | | | |
|---|---|---|---|
| 5,276,616 A * | 1/1994 | Kuga et al. ...................... 704/10 |
| 8,306,967 B2 * | 11/2012 | Galitsky et al. ............... 707/713 |
| 8,484,230 B2 * | 7/2013 | Harnett ............ G06F 17/30637 |
| | | | 707/755 |
| 8,732,213 B2 * | 5/2014 | Sowell et al. .................. 707/809 |
| 2004/0163043 A1 * | 8/2004 | Baudin et al. ................. 715/513 |
| 2005/0114508 A1 * | 5/2005 | DeStefano .................... 709/224 |
| 2006/0155725 A1 * | 7/2006 | Foster et al. .................. 707/100 |
| 2009/0119307 A1 * | 5/2009 | Braun et al. .................. 707/100 |
| 2010/0274770 A1 * | 10/2010 | Gupta et al. .................. 707/688 |
| 2011/0035390 A1 * | 2/2011 | Whitehouse .................. 707/755 |
| 2011/0202545 A1 * | 8/2011 | Kawai et al. .................. 707/755 |
| 2011/0246467 A1 * | 10/2011 | Probst et al. .................. 707/739 |
| 2011/0320493 A1 * | 12/2011 | Lemoine ........................ 707/776 |
| 2012/0005542 A1 | 1/2012 | Peterson et al. |
| 2012/0124047 A1 * | 5/2012 | Hubbard ........................ 707/737 |
| 2013/0097125 A1 * | 4/2013 | Marvasti et al. .............. 707/692 |
| 2013/0185286 A1 * | 7/2013 | Galitsky et al. ............... 707/722 |
| 2014/0310291 A1 * | 10/2014 | Huang et al. .................. 707/755 |
| 2015/0161160 A1 * | 6/2015 | Chen et al. .................... 707/639 |

* cited by examiner

*Primary Examiner* — Michael N Opsasnick
*Assistant Examiner* — Kee Young Lee
(74) *Attorney, Agent, or Firm* — Van Pelt, Yi & James LLP

(57) ABSTRACT

A log message is processed. The log message to be processed is received. One or more portions of the log message to be separately extracted are identified. A value is extracted from each identified portion. Extracting the value includes using an extraction rule. The extraction rule is associated with the identified portion.

20 Claims, 9 Drawing Sheets

```
RecognizerName: applicationRecognizer
    type: 1
    priority: 4
    KeywordStrings:
    - 'app'
    - 'applicationname'
    - 'using'
    Modifier: false
---
    RuleName: 'MSSQL ApplicationName'
    KeywordRegexFilter: 'ApplicationName'
    DeviceFilter: 55
    SearchRegex: '(?:\=")([^"]+)"'
    ColumnName: 'application'
---
    RuleName: 'Using App Rule'
    KeywordRegexFilter: 'using'
    DeviceFilter: 9, 18
    SearchRegex: '\s(\S+)'
    ColumnName: 'service'
---
    RuleName: 'App Recognizer Rule'
    KeywordRegexFilter: 'app'
    DeviceFilter: 0
    SearchRegex: '(?:\=)"?([^",\s]+)'
    ColumnName: 'application'
...
```

- 302 } Header
- 304 } Rule
- 306 } Rule
- 308 } Rule

FIG. 3A

```
name: myTimeStampRecognizer
type: 2                              ⎫
priority: 3                          ⎬ Header ⎯ 310
Limit: 2000                          ⎭ keywordregex:
Rule 1
   - '\d{9,}.\d{6}'                  ⎫
# Rule 2                              ⎬ Regular Expressions ⎯ 312
   - '\d{9,}.\d{3}'                  ⎭
# Rule 3
   - '[0-9A-F]{12}'

ColumnNames:
# ColumnName 1
   - 'timeStamp'                     ⎫
# ColumnName 2                       ⎬ Column Names ⎯ 314
   - 'timeStamp'                     ⎭
# ColumnName 3
   - 'timeStamp'

Functions:
# Function 1
   - 'll_strptime(%s.%f)'            ⎫
# Function 2                         ⎬ Functions ⎯ 316
   - 'll_strptime(%s.%e)'            ⎭
# Function 3
   - 'tp_hex(tp_hex)'
```

FIG. 3B

SEMANTICS-ORIENTED ANALYSIS OF LOG MESSAGE CONTENT

BACKGROUND OF THE INVENTION

Devices, servers, applications and other computer systems log system, security, application, and other information. The messages in these logs must be analyzed to turn raw data into actionable intelligence. Unfortunately, log messages are not always well-specified (i.e., with a formal grammar), and log analysis systems must reverse engineer patterns from example data. Existing log message parsers require that the entire log message is to conform to a specific pattern prescribed by a regular expression to enable the log message to be parsed. Given a log message and its type, a parser runs the message against the appropriate regular expression and extracts the elements of interest. However, in order to utilize the parser, the parser must have a priori knowledge of the entire message structure and a regular expression for the entire message. Log messages, by nature, are not rigidly structured like programming languages, but instead are loose amalgams of simply structured fragments intended for human consumption. Even with a regular expression parsing the entire message, the regular expression is susceptible to failure due to slight variations in log message formats. Therefore, there exists a need for a better way to analyze a log message.

BRIEF DESCRIPTION OF THE DRAWINGS

Various embodiments of the invention are disclosed in the following detailed description and the accompanying drawings.

FIG. 3A shows an example of a value-after message processing recognizer with three rules.

FIG. 3B shows an example of a direct message processing recognizer with three rules.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing a log message is disclosed. In some embodiments, one or more portions of a log message are identified to be separately extracted. For example, instead of utilizing one regular expression to parse the entire log message, one or more portions of the log message are identified to be extracted using one or more different regular expressions. In some embodiments, identifying the portions includes searching for keywords within the log message that indicate a portion to be separately extracted using an extraction rule associated with the keyword. A value is extracted from each identified portion using an extraction rule associated with the corresponding identified portion. For example, a regular expression of the extraction rule is used to extract a matching value from the identified portion (e.g., from log message contents located after a corresponding matched keyword of the identified portion).

Figure 1:
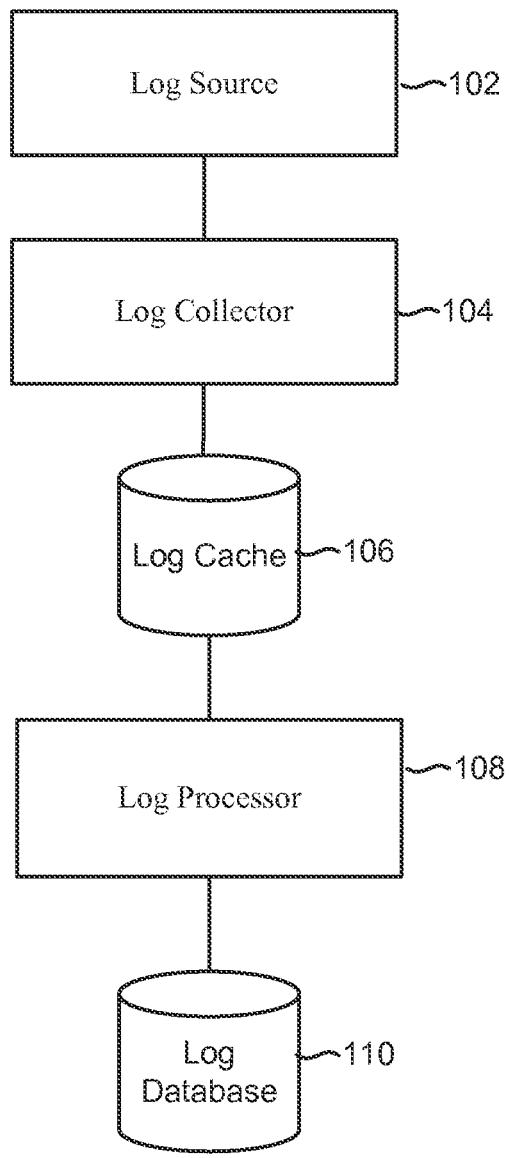
FIG. 1 is a block diagram illustrating an embodiment of a system for processing a log message.

FIG. 1 is a block diagram illustrating an embodiment of a system for processing a log message. Log source 102 includes one or more systems, devices, software components, hardware components, storages, memory, and/or any other source that provides a log message. For example, log source 102 includes a storage storing log messages. Examples of the log message include a system log message, a network log message, a security log message, a storage log message, an operating system log message, and an application log message. Log collector 104 obtains one or more log messages from log source 102. Log collector 104 may obtain one or more files, streamed logs, and/or output of a process from log source 102 in obtaining the one or more log messages. Log collector 104 may be a network node, a network appliance, a process, a system, a device, and/or a plugin/module of a system of log source 102. In some embodiments, log collector 104 obtains one or more log messages from log source 102 periodically. For example, log collector 104 checks for new log messages on a predetermined periodic interval. In some embodiments, log collector 104 obtains one or more log messages from log source 102 dynamically. For example, log collector 104 is provided a log message when the log message is generated.

One or more log messages obtained by log collector 104 are stored in log cache 106. For example, log cache 106 stores log messages to be processed/parsed. In some embodiments, log cache 106 is included a device of log collector 104. In some embodiments, log cache 106 is included as a device of log processor 108. In some embodiments, log cache 106 is included in a network storage device. Log processor 108 obtains logs from log cache 106 for processing. In an alternative embodiment, log cache 106 is not utilized and one or more logs obtained by log collector 104 are directly provided to log processor 108. Log processor 108 processes each obtained log message using one or more processing rules. For example, one or more portions of a log message are identified to be separately extracted and each identified portion is extracted using a corresponding regular expression to extract desired data from the log message portion. Additional processing may be performed to resolve conflicts and/or perform aggregation associated with the extracted data of the identified portions. Results of log processor 108 are stored in log database 110. For example, extracted data from identified portions of the log message are stored in log database 110. In some embodiments, one or more other components utilize contents of log database 110 to provide alerts, analyze log message trends, search log message contents, and/or perform any other processing associated with structured log message contents. For example, an indexer indexes contents of log database 110 to enable further analysis of log message contents.

The components shown in FIG. 1 may be implemented in one or more computers, servers, storage devices, networking components, and/or virtual components/networks. For example, any number of components shown in FIG. 1 may be included in the same device. Connection between the components may include one or more of the following: a direct or indirect physical communication connection, mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. Although single instances of components have been shown to simplify the diagram, additional instances of any of the components shown in FIG. 1 may exist. For example, other instances of any component shown in FIG. 1 may exist. Components not shown in FIG. 1 may also exist.

Figure 2:
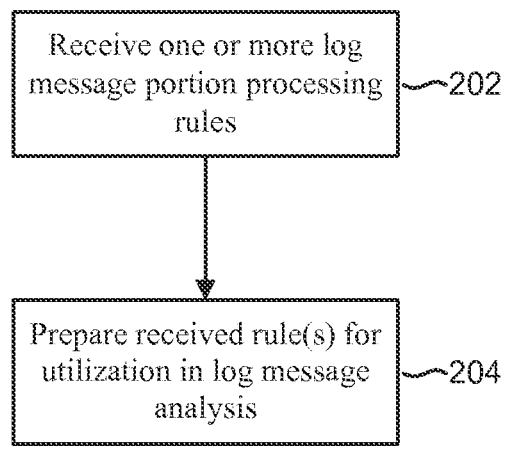
FIG. 2 is a flowchart illustrating an embodiment of a process for processing a log message portion processing rule.

FIG. 2 is a flowchart illustrating an embodiment of a process for processing a log message portion processing rule. The process of FIG. 2 may be implemented on log processor 108 of FIG. 1.

At 202, one or more log message portion processing rules are received. In some embodiments, the rules are received from a user/administrator that coded how a log message portion should be processed. In some embodiments, one or more processing rules may be specified together as a recognizer. For example, a recognizer includes a header specifying common configuration elements of the one or more rules included in the recognizer and specifications of one or more rules. In some embodiments, receiving the one or more log message portion processing rules includes receiving one or more programming code complied rules/recognizers. In some embodiments, receiving the one or more log message portion processing rules includes receiving one or more files, and each file may include a recognizer and/or one or more processing rules. Various types of message portion processing rules and/or recognizers may be received.

One example type of received message processing rule/recognizer includes a value-after log message processing rule/recognizer. The value-after message processing rule indicates a keyword and a specification (e.g., regular expression) of how to process/parse/match message contents that follow the keyword of the rule. For example, a rule may specify keyword "user" and a regular expression specifying how to parse/match a username that follows the characters "user" in a log message.

FIG. 3A shows an example of a value-after message processing recognizer with three rules. This recognizer may be specified in a file. The recognizer shown in FIG. 3A includes header 302, rule 304, rule 306, and rule 308. Header 302 specifies recognizer configuration. Below is a table describing information specified in header 302.

| FIELD | DESCRIPTION |
| --- | --- |
| RecognizerName | Name of the recognizer. |
| Type | Identifier of type of recognizer. "1" specifies that this is a value-after recognizer. |
| Priority | Identifier of recognizer priority over other recognizers. The relative priorities of the value-after recognizers impact the order in which discovered keywords are processed. |
| KeywordStrings | The keywords whose discovery will trigger this recognizer. |
| Modifier | When set to "true," the current keyword is treated as a modifier of (and may be consolidated with) another recognizer's keyword. |

The recognizer of FIG. 3A includes three rules. Below is a table describing information specified for rules 304, 306 and 308.

| FIELD | DESCRIPTION |
| --- | --- |
| RuleName | Name identifier of the rule. |
| KeywordRegexFilter | The regular expression that must match the discovered keyword for this rule to be executed. In some embodiments, a keyword (e.g., keyword regular expression) for a rule must be unique across all rules of all recognizers. |
| DeviceFilter | The message type that must match the type of the log message for this rule to be executed. In some embodiments, if DeviceFilter is specified as "0," the message type is matched for all messages with an unidentified/unknown message type. The message type may be a combination of a comma separated list, a range of a values (e.g., 1-5), or apply to all messages if not specified. |
| SearchRegex | The regular expression applied to the position after the keyword to extract a value. In some embodiments, the SearchRegex must fully match the log message text starting at the position after the keyword for the rule to be executed. In some embodiments, the SearchRegex may include regular expression syntax that produces multiple value matches and multiple values may result from a rule match. |
| ColumnName | The normalized column name under which an extracted value will be inserted into a database. |

In some embodiments, a "Reverse" field may be added to a rule to anchor its SearchRegex to the position after a previous keyword in the message and/or a position before a currently matched keyword, for extraction in cases where at least one value precedes the currently matched keyword. In some embodiments, a value-before recognizer/rule type exists to handle cases where a desired value precedes a matched keyword. Such rules may also capture values after the keyword in some cases.

Another example type of received message processing rule/recognizer includes a direct message processing rule/recognizer. The direct message processing rule indicates a direct specification (e.g., regular expression) of how to process/parse/match message contents that match the direct specification. For example, direct recognizers/rules are used to capture values that can be discovered directly without the need of an associated keyword. In some embodiments, direct recognizers/rules are utilized to process portions of a log message that have not been matched by value-after recognizers/rules.

FIG. 3B shows an example of a direct message processing recognizer with three rules. This recognizer may be specified in a file. The recognizer shown in FIG. 3B includes header 310, regular expressions 312, column names 314, and functions 316. Header 310 specifies an identifier name of the recognizer in the "name" field, an identifier of a recognizer type (e.g., identifier "2" specifies that this recognizer is a direct recognizer and not a value-after recognizer) in the "type" field, a relative recognizer processing priority (e.g., among direct recognizers) in the "priority" field, and an identification of a maximum number of beginning characters of a log message region that the direct recognizer will evaluate in the "Limit" field (e.g., "Limit" field may be optional). Regular expressions 312 specifies regular expressions of three rules that each specify the regular expression to be utilized to invoke the rule and parse values from a matching log message portion. Column names 314 specifies for each of the three rules a normalized column name under which an extracted value will be inserted into the database. Functions 316 specifies for each of the three rules, functions to be utilized to further process a value resulting from a corresponding regular expression specified in regular expressions 312. For example, a function that transforms a format of an obtained value is specified. Other examples of functions include functions that translate, convert, alert, store, and/or otherwise process regular expression matching values of the rule.

Returning to FIG. 2, at 204, the received rule(s) are prepared for utilization in log message analysis. In some embodiments, the received rules/recognizers are stored in a list of rules/recognizers to be utilized to evaluate a log message. In some embodiments, one or more keywords and/or regular expressions to be located within a log message are stored in a data/process structure to be utilized to identify portions of the log message to be further processed using associated rules/recognizers. For example, using the received recognizer(s)/rule(s), a table of keywords/regular expressions and associated rules/recognizers are generated and when a keyword in the table is found in a log message, the rule/recognizer associated with the keyword is invoked.

Figure 4:
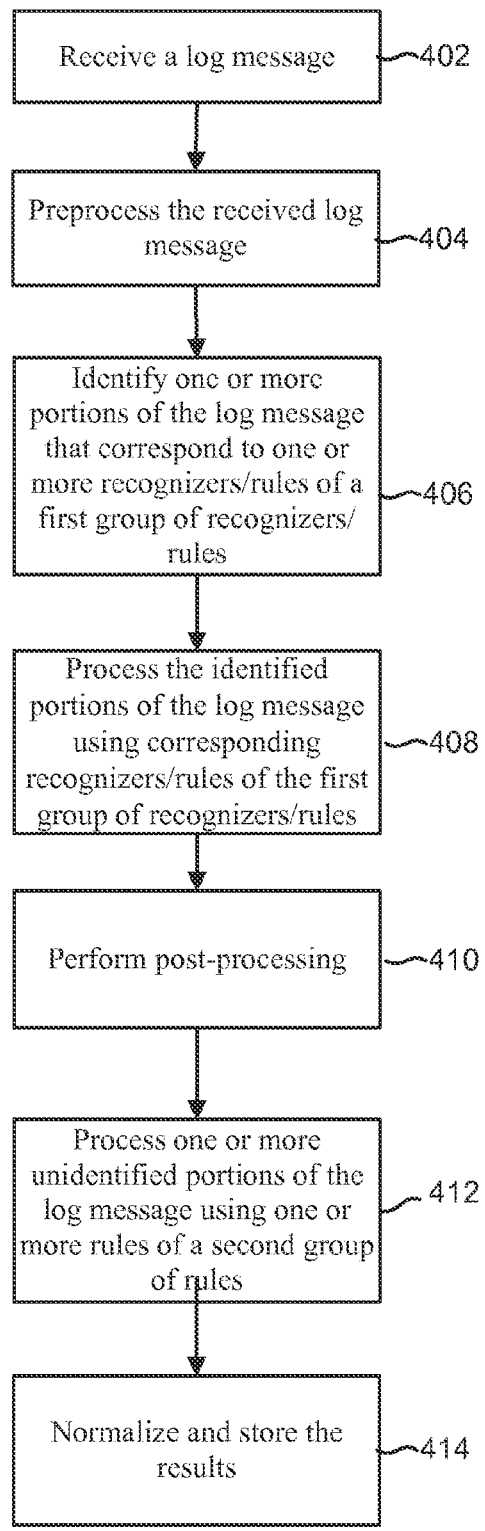
FIG. 4 is a flowchart illustrating an embodiment of a process for processing a log message.

FIG. 4 is a flowchart illustrating an embodiment of a process for processing a log message. The process of FIG. 4 may be implemented on log processor 108 of FIG. 1.

At 402, a log message is received. In some embodiments, receiving the log message includes receiving the log message from log collector 104 and/or log cache 106 of FIG. 1. In some embodiments, the received log message is one of a plurality of received log messages. For example, a log file is received and the received log message is one line of the log file. In some embodiments, one or more log messages are received periodically. For example, a check for new log messages is performed on a predetermined periodic interval. In some embodiments, one or more log messages are received dynamically. For example, a log message is received via a communication stream as the message is generated.

At 404, the received log message is preprocessed. In some embodiments, preprocessing the message includes identifying a type of the message. In some cases, the message type is specified by a log collector, such as log collector 104 of FIG. 1. The specified message type may be utilized as the message type of the received log message without attempting to discover the message type. A type of the message may be determined based at least in part on a source of the message, a metadata associated with the message, and/or using a keyword matching heuristic. For example, one or more message types are associated with one or more keywords and/or regular expressions and if matching keyword(s) and/or regular expression(s) for a particular message type are found in a log message, the log message is identified as the particular message type. In some embodiments, a recognizer/rule may be associated with a specific log message type. For example, a log message type for a recognizer/rule is specified in header 302 of the example recognizer of FIG. 3A and header 310 of the example recognizer of FIG. 3B. The message type may be a specific message type or an unknown message type. In some embodiments, a plurality of message types may be identified for a single log message.

In some embodiments, preprocessing the message includes inferring keywords associated with one or more portions of the log message. In some embodiments, implied keywords are determined using a previously received log message or a rule which specifies an implied header row and the implied keywords are associated with currently processing log messages as metadata for use by a value-after recognizer/rule. For example, a message type may be known to provide tabular data with a header row:

| IP Address | Port | Last Connect Time |
|---|---|---|
| 192.168.1.1 | 20 | 2013-04-09T20:55Z |
| 192.168.10.1 | 43 | 2013-04-03T07:14Z |
| 192.168.1.164 | 23 | 2013-03-31T14:52Z |

If each of these four lines is received as a separate log message, a value-after recognizer would be unable to locate keywords of the first row that are the column identifier of the other rows. In certain situations, such as file-based logging, preprocessing can discard the table header log message and tag the data-containing log messages with metadata that indicates the implied keywords. In some embodiments, if a message type does not include a table header row, one or more implied keywords may be still associated with one or more portions of the logs message, if the message structure can be identified (e.g., keywords implied for messages of certain determined message types).

At 406, one or more portions of the log message that correspond to one or more recognizers/rules of a first group of recognizers/rules are identified. In some embodiments, the first group of recognizers/rules includes value-after recognizers/rules. In some embodiments, all keywords of all keyword-based recognizers (e.g., value-after recognizer) are placed in a single data structure (e.g., structure determined in 204 of FIG. 2) and used to identify all matching keywords in the log message in a single search pass (e.g., table walk, deterministic finite automata, etc.) through the log message. In some embodiments, a result of step 406 includes a list of keyword(s) matched in the log message, their location in the log message, and references to the recognizer/rule corresponding to each of the matched keyword(s). This list may be sorted by priority associated with recognizers/rules (e.g., priority identified in header 302 of FIG. 3A).

For example, if these three Recognizers:

RecognizerName: userRecognizer
priority: 1

```
KeywordStrings:
 - 'user'
RecognizerName: limitRecognizer
  priority: 3
  KeywordStrings:
   - 'limit'
RecognizerName: processRecognizer
  priority: 2
  KeywordStrings:
   - 'process'
``` were applied to the log message:

Warning: User jones exceeded memory limit (10 GB) with process memdb it would return the ordered list of keywords [user, process, limit], and the related recognizers would be executed in the order of this list in 408.

At 408, the identified portions of the log message are processed using corresponding recognizers/rules of the first group of recognizers/rules. In some embodiments, for each identified portion of the log message in 406, the identifier recognizer/rule is processed in order of identified priority of the recognizer/rule. For example, if the keyword of the recognizer/rule (e.g., specified in "KeywordRegexFilter" field in rule 304 of FIG. 3A) matches a word in the identified portion, a message type of the recognizer/rule (e.g., specified in "DeviceFilter" field in rule 304 of FIG. 3A) matches the identified message type (e.g., determined at 404) of the log message, and the regular expression of the recognizer/rule (e.g., specified in "SearchRegex" field in rule 304 of FIG. 3A) matches contents after the identified keyword in the log message, then the resulting value (e.g., one or more values) of the regular expression is identified as a value of the identified portion corresponding to the identified keyword (e.g., resulting keyword/value pair for each successfully matched rule). In some embodiments, for each successfully determined keyword/value pair, its location within the log message is identified to later check for overlaps in post-processing and locate any unidentified portion of the log message.

At 410, post-processing is performed. In some embodiments, performing post-processing includes error checking the results of step 408. In some embodiments, performing post-processing includes resolving conflicts between overlapping identified keywords or values in the log message. For example, each word/content of the log message can only be identified as a keyword or a value of a single rule (e.g., a word in a log message cannot be a keyword of one rule and a value of another rule). In some embodiments, values have higher priority over keywords and if a value and a keyword overlap, the value is retained and the keyword and its associated value are discarded. In some embodiments, longer values have priority over shorter values. In some embodiments, performing post-processing includes aggregating keywords. For example, if a value-after recognizer has been configured as a modifier (e.g., configured in "Modifier" field of header 302 of FIG. 3A) and this value-after recognizer has generated a match in the log message, the matching keyword of the recognizer is combined with the value of the recognizer if the value is also a keyword of another identified keyword/value pair of another recognizer/rule.

At 412, one or more unidentified portions of the log message are processed using one or more rules of a second group of rules. In some embodiments, the identified portion of the log message is a portion of the log message that has been identified as either a keyword or a value using the recognizers/rules (e.g., value-after recognizer/rule) utilized in 408. In some embodiments, the second group of rules includes direct recognizers/rules such as the recognizer shown in FIG. 3B. In some embodiments, it is determined whether any of the unidentified portions matches a regular expression of the second group of recognizers/rules. If a match is found, the matched portion of the log message may be identified as the value of a keyword/column name identified in the matched rule. In some embodiments, if a match is found, the matched portion of the log message is provided as input to a function associated with the matched rule and a resulting output of the function is identified as the value of a keyword/column name (e.g., column names 314 of FIG. 3B) identified in the matched rule.

At 414, results are normalized and stored. In some embodiments, the results include the resulting keywords and value identified within the log message after step 410 and step 412. For example, after step 410, the post-processed keyword and value of value-after recognizers/rules identified in the log message that do not conflict or overlap are identified and after step 412, the values in the log message that are associated with specified column names in the direct matching rule are identified. In some embodiments, keywords and matching column names of the log message portions are normalized to standardize semantically-alike identifiers. For example, "IP Addr" and "IP Address" may be normalized to "IP." In some embodiments, storing the results includes storing the value of an identified keyword/value of a matched recognizer/rule (e.g., value-after recognizer/rule) in a database (e.g., stored in database 110 of FIG. 1) by storing the value under a database column name of the keyword (e.g., normalized keyword). The database column name to be utilized may be specified in a rule (e.g., in rule 304 of FIG. 3A). Two or more column names may be concatenated together and utilized if the keyword/value being stored has resulted from combining two or more rules (e.g., modifier rule). In some embodiments, storing the results includes storing the value of an identified column name/value of a matched recognizer/rule (e.g., direct recognizer/rule) in a database (e.g., stored in database 110 of FIG. 1) by storing the value under a database column name specified in the matched rule (e.g., normalized column name).

Figure 5:
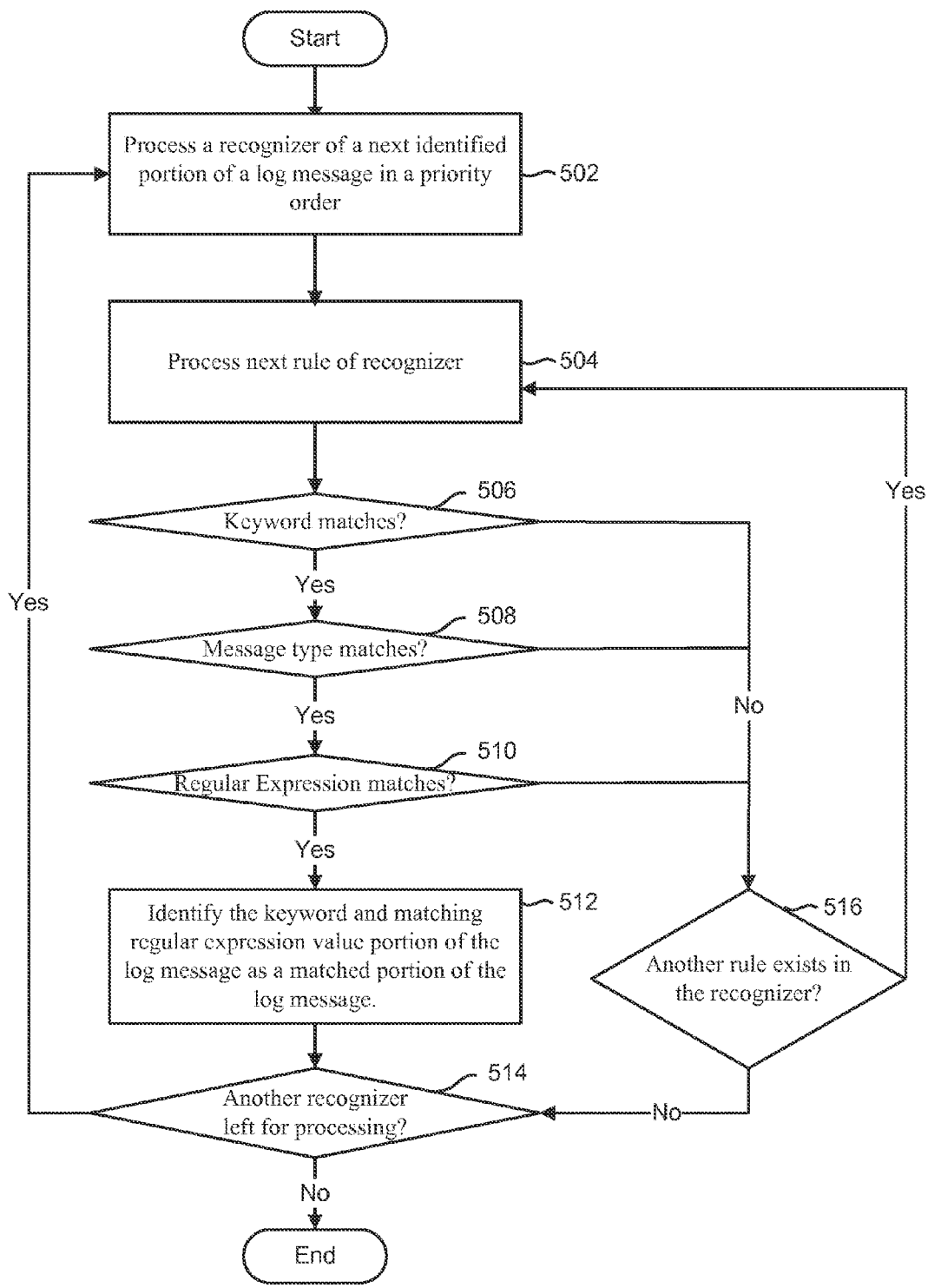
FIG. 5 is a flowchart illustrating an embodiment of a process for processing a log message portion using a value-after recognizer/rule.

FIG. 5 is a flowchart illustrating an embodiment of a process for processing a log message portion using a value-after recognizer/rule. The process of FIG. 5 may be implemented on log processor 108 of FIG. 1. In some embodiments, the process of FIG. 5 is included in 408 of FIG. 4.

At 502, a recognizer of a next identified portion of a log message is processed in a priority order of the recognizer. In some embodiments, the recognizers applicable to the log message and their associated priorities are determined in 406 of FIG. 4. For example, each recognizer and associated identified portion of the log message are received from a prioritized list of keyword(s) matched in the log message and referenced to the recognizer corresponding to each of the matched keyword(s).

At 504, a next rule of the recognizer is processed. For example, the recognizer being processed includes a plurality of rules and a next rule of the recognizer is obtained for processing.

At 506, it is determined whether a keyword of the rule being processed matches a portion of the log message identified for the recognizer. In some embodiments, the portion of the log message has been identified in 406 of FIG. 4 for the recognizer and the keyword of the rule being processed is verified for a match with the identified portion. For example, it is determined whether a keyword and/or regular expression specified in the "KeywordRegexFilter" field (e.g., in rule 304 of FIG. 3A) of the rule being processed matches content in the identified portion of the log message. If it is determined that the keyword of the rule matches, the process continues to 508. If it is determined that the keyword of the rule does not match, the process continues to 516.

At 508, it is determined whether a message type applicable to the rule being processed matches a determined message type of the log message being processed. In some embodiments, it is determined whether the type of the log message that has been identified in 404 of FIG. 4 matches a message type specified in the recognizer (e.g., in header 302 of FIG. 3A) of the rule being processed. For example, it is determined whether a message type identifier specified in the "Device-Filter" field (e.g., in rule 304 of FIG. 3A) of the rule being processed matches a determined type of the log message. In some embodiments, if the message type specified for the rule is an unidentified/unknown message type, the message type is matched for all messages with an unidentified/unknown message type. If it is determined that the message type of rule matches, the process continues to 510. If it is determined that the message type of the rule does not match, the process continues to 516. A rule may specify any valid message type or range of message types.

At 510, it is determined whether a regular expression of the rule being processed matches a portion of the log message associated with the matched keyword portion of the log message. In some embodiments, the portion of the log message associated with the keyword has been identified in 406 of FIG. 4 for the recognizer and it is determined whether a portion of the log message following the matched keyword portion matches a regular expression of the rule being processed. In some embodiments, it is determined whether the regular expression specified in the "SearchRegex" field (e.g., in rule 304 of FIG. 3A) of the rule being processed matches content associated with keywords matched (e.g., matched in 406) in the log message. For example, the regular expression must match at least a portion of the contents of the log message after the matched keyword. In another example, the regular expression must match at least a portion of the contents of the log message before the matched keyword, or both. In some embodiments, the portion of the log message that matches the regular expression is identified as a resulting value of the match. If it is determined that the regular expression of the rule matches, the process continues to 512. If it is determined that the regular expression of the rule does not match, the process continues to 516.

At 512, the keyword and matching regular expression value portion of the log message are identified as a matched portion of the log message. For example, the keyword and value pair is stored in a data structure and the matching portion of the log message is labeled as matching the keyword and value to locate conflicting and unidentified portions of the log message in a subsequent post-processing.

At 514, it is determined whether any identified recognizer for an identified portion of the log message is left for processing. If it is determined that another recognizer exists for processing, the process returns back to 502. If it is determined that no recognizers (e.g., all value-after recognizers have been processed) are left for processing, the process ends.

At 516, it is determined whether another rule exists in the recognizer being processed. If another rule exists, the process returns to 504. If another rule does not exist, the process proceeds to 514.

Figure 6:
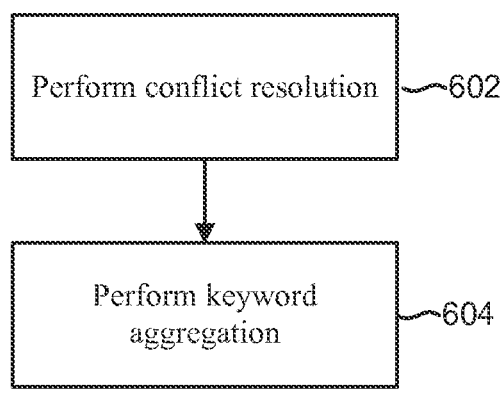
FIG. 6 is a flowchart illustrating an embodiment of a process for post-processing results of rule processing.

FIG. 6 is a flowchart illustrating an embodiment of a process for post-processing results of rule processing. The process of FIG. 6 may be implemented on log processor 108 of FIG. 1. In some embodiments, the process of FIG. 6 is included in 410 of FIG. 4.

Figure 7A:
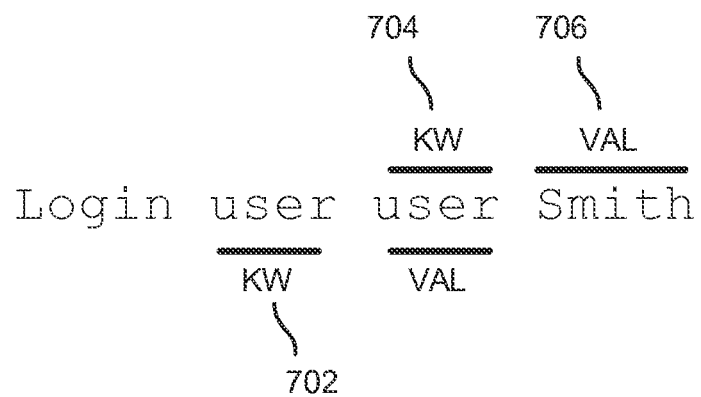
FIG. 7A is an example log message with overlapping identified keywords and values.

At 602, conflict resolution is performed. For example, conflicts between overlapping identified keywords or values in the log message are resolved. In some embodiments, each word/character/content of the log message may be only identified as either a keyword or a value of a single rule (e.g., a word in a log message cannot be a keyword of one rule and a value of another rule). For example, a log message may be identified/parsed into two keyword/value pairs as shown in FIG. 7A. FIG. 7A is an example log message with overlapping identified keywords and values. A first rule has identified "user" 702 as a keyword and "user" 704 as the associated value of the keyword. A second rule has identified "user" 704 as a keyword and "Smith" 706 as the associated value of the keyword. Thus, "user" 704 has been identified/tagged as both a keyword and a value. This conflict must be resolved to either discard the identifications of the first rule or the second rule. In some embodiments, values have higher precedence over keywords. For example, in the example of FIG. 7A, the "user" 704 conflict is resolved by identifying "user" 704 as a value and removing/deleting the keyword identification of "user" 704 and value identification of "Smith" 706. In some embodiments, longer values have higher precedence over shorter values. For example, if two value identifications overlap, the longer value is retained and the shorter value and its associated keyword is discarded. In some embodiments, keywords cannot overlap because multiple recognizers/rules may not be specified for the same keyword. In some embodiments, in the event keywords overlap, one or more conflict resolution rules (e.g., priority identifier in recognizer header is used to resolve the conflict) may be used to resolve the conflict between the keyword identifications.

Figure 7B:
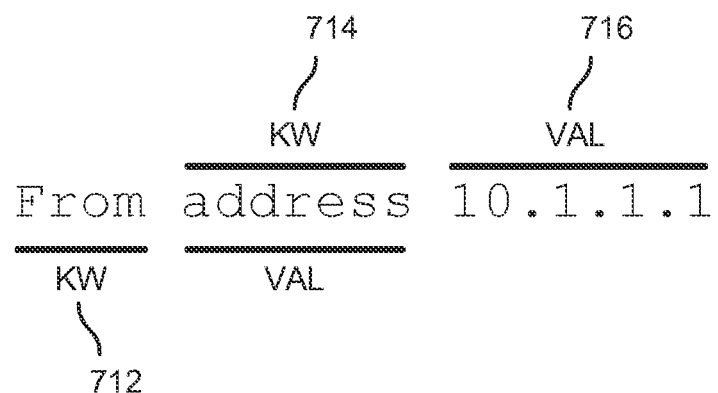
FIG. 7B is an example log message with overlapping identified keywords and values of a modifier recognizer.

At 604, keyword aggregation is performed. For example, if a value-after recognizer has been configured as a modifier (e.g., configured in "Modifier" field of header 302 of FIG. 3A) and this value-after recognizer has generated a match in the log message, the matching keyword of the recognizer is combined with the value of the recognizer as a combined keyword if the value is also a keyword of another identified keyword/value pair of another recognizer/rule. FIG. 7B is an example log message with overlapping identified keywords and values of a modifier recognizer. A first rule of a modifier identifier recognizer has identified "From" 712 as a keyword and "address" 714 as the associated value of the keyword. A second rule has identified "address" 714 as a keyword and "10.1.1.1" 716 as the associated value of the keyword. Because the recognizer that processed "From" 712 is designated a modifier, "From" 712 and "address" 714 are concatenated into a compound or aggregated keyword "From address" and the associated value of the aggregated keyword is "10.1.1.1" 716.

Figure 8:
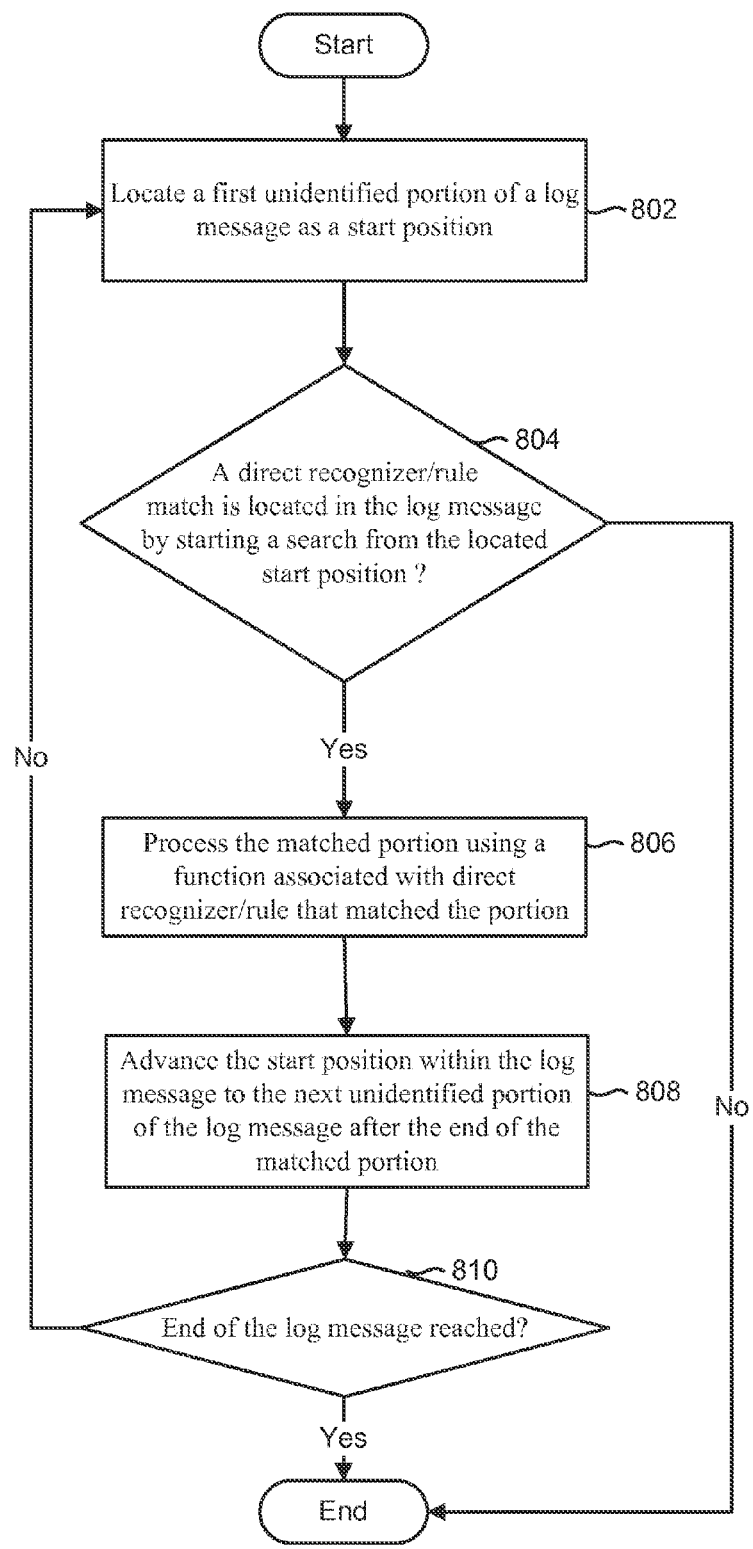
FIG. 8 is a flowchart illustrating an embodiment of a process for processing a log message portion using a direct recognizer/rule.

FIG. 8 is a flowchart illustrating an embodiment of a process for processing a log message portion using a direct recognizer/rule. The process of FIG. 8 may be implemented on log processor 108 of FIG. 1. In some embodiments, the process of FIG. 8 is included in 412 of FIG. 4.

At 802, a first unidentified portion of a log message is located as a start position. In some embodiments, the log message is the log message processed using the process of FIG. 4 until step 410. For example, portions of the log message have been identified as a keyword or a value and post-processed to resolve conflicts and combine modifier keywords. The first portion of the log message (e.g., examining from left to right) that has not been identified as a keyword or a value of another group of recognizers/rules (e.g., not identified by value-after recognizers/rules) is located.

At 804, it is determined whether a direct recognizer/rule match is located in the log message by starting a search from the located start position. In some embodiments, the longest left most match of all matches of rules of direct recognizers is determined. In some embodiments, the direct recognizers are direct recognizers received at 202 of FIG. 2 to be used to process the log message. All regular expressions (e.g., regular expressions 312 of FIG. 3B) of all rules of all direct recognizers to be utilized are formed into a single disjunction of all regular expressions (e.g., [Regular expression 1] v [Regular expression 2] v [Regular expression 3] . . . ) and used to locate a match in the log message starting from the located starting position. This may allow for simultaneous searching via a Nondeterministic Finite Automata and/or Deterministic Finite Automata. In some embodiments, a match may be only found in a portion of the log message that has not been identified by another recognizer/rule (e.g., cannot match the portion of the log message already identified as a keyword or value by a value-after recognizer/rule).

If at 804, a match has been found, at 806, the matched portion is processed using a function associated with the direct recognizer/rule that matched the portion. For example, a function specified in functions 316 of FIG. 3B that corresponds to the matched regular expression is provided the matched portion. The function may return a result that is stored in a database under a column name specified in the matched recognizer/rule (e.g., specified in column names 314 of FIG. 3B).

At 808, the start position within the log message is advanced to the next unidentified portion of the log message after the end of the matched portion.

At 810, it is determined whether the end of the log message has been reached. If the end of the log message has been reached, the process ends. If the end of the log message has not been reached, the process then returns to 802.

If at 804, a match has not been found, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for computer parsing a log message, comprising:
   a communication interface configured to receive the log message, wherein the log message includes a computer log message; and
   a processor coupled with the communication interface and configured to:
      identify one or more portions of the log message to be separately extracted;
      extract from each identified portion a value using an extraction rule associated with the identified portion, wherein an identified portion of the log message can only be extracted by a single extraction rule;
      resolve a conflict between at least a first extraction rule and a second extraction rule, including by
         determining whether a term of the identified portion of the log message has been identified as a keyword by the first extraction rule and also as a value by the second extraction rule, and
         rejecting the first extraction rule due to a determination that the term of the identified portion of the log message has been identified as the keyword by the first extraction rule and as the value by the second extraction rule; and
      provide to a user a computer alert based on a result of the second extraction rule stored via a computer network to a computer storage of the system;
      wherein the first extraction rule and the second extraction rule are computer parsing rules of a computer parser parsing the computer log message of the system.

2. The system of claim 1, wherein the processor is further configured to determine a message type of the log message.

3. The system of claim 2, wherein extracting the value includes determining whether the determined message type matches a specified message type of the extraction rule.

4. The system of claim 2, wherein the type of the log message is determined based at least in part on a source of the log message.

5. The system of claim 2, wherein the type of the log message is determined based at least in part on a keyword included in the log message.

6. The system of claim 1, wherein the processor is further configured to infer a keyword associated with one of the identified portions at least in part by using associated content of another previously received log message.

7. The system of claim 1, wherein identifying the one or more portions of the log message includes determining that the log message includes one or more keywords of one or more extraction rules.

8. The system of claim 1, wherein identifying the one or more portions of the log message includes determining a priority processing order of the one or more portions of the log message based at least in part on a priority identifier of the extraction rule associated with each of the identified portions.

9. The system of claim 1, wherein the extraction rule of at least one of the identified portion is a part of a recognizer that includes a plurality of extraction rules.

10. The system of claim 1, wherein a different extraction rule is associated with each of the identified portions.

11. The system of claim 1, wherein the value is a portion of the log message that matches a regular expression of the extraction rule.

12. The system of claim 1, wherein the processor is further configured to combine a located keyword within the log message with an associated value located in the log message in the event it is determined that the keyword and the associated value match a modifier extraction rule and the associated value is a matched keyword of another extraction rule.

13. The system of claim 1, wherein the processor is further configured to use a second group of one or more extraction rules to extract one or more portions of the log message that have not been already identified to be separately extracted.

14. The system of claim 13, wherein using the second group of one or more extraction rules includes matching a single regular expression of a disjunction combination of a rule regular expression from each extraction rule of the second group of one or more extraction rules.

15. The system of claim 1, wherein the value is stored in a database.

16. The system of claim 15, wherein the value is stored under a column name associated with a keyword of the extraction rule used to extract the value stored in the database.

17. The system of claim 16, wherein the column name is normalized to standardize semantically-alike column names.

18. A method for computer parsing a log message, comprising:
   receiving the log message, wherein the log message includes a computer log message;
   identifying one or more portions of the log message to be separately extracted;
   using a processor to extract from each identified portion a value using an extraction rule associated with the identified portion, wherein an identified portion of the log message can only be extracted by a single extraction rule;

resolving a conflict between at least a first extraction rule and a second extraction rule, including by determining whether a term of the identified portion of the log message has been identified as a keyword by the first extraction rule and also as a value by the second extraction rule, and rejecting the first extraction rule due to a determination that the term of the identified portion of the log message has been identified as the keyword by the first extraction rule and as the value by the second extraction rule; and providing to a user a computer alert based on a result of the second extraction rule stored via a computer network to a computer storage of the system;

wherein the first extraction rule and the second extraction rule are computer parsing rules of a computer parser parsing the computer log message of the system.

19. The method of claim 18, further comprising determining a message type of the log message.

20. A computer program product for computer parsing a log message, the computer program product being embodied in a tangible computer readable storage medium and comprising computer instructions for:

receiving the log message, wherein the log message includes a computer log message;

identifying one or more portions of the log message to be separately extracted;

extracting from each identified portion a value using an extraction rule associated with the identified portion, wherein an identified portion of the log message can only be extracted by a single extraction rule;

resolving a conflict between at least a first extraction rule and a second extraction rule, including by determining whether a term of the identified portion of the log message has been identified as a keyword by the first extraction rule and also as a value by the second extraction rule, and rejecting the first extraction rule due to a determination that the term of the identified portion of the log message has been identified as the keyword by the first extraction rule and as the value by the second extraction rule; and providing to a user a computer alert based on a result of the second extraction rule stored via a computer network to a computer storage of the system;

wherein the first extraction rule and the second extraction rule are computer parsing rules of a computer parser parsing the computer log message of the system.

* * * * *